United States Patent
Lynn et al.

(10) Patent No.: US 6,606,740 B1
(45) Date of Patent: Aug. 12, 2003

(54) DEVELOPMENT FRAMEWORK FOR CASE AND WORKFLOW SYSTEMS

(75) Inventors: Anita Hsueh Lynn, Arlington, VA (US); Matthew Hagopian, Arlington, VA (US); Charles Gilmour, Washington, DC (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/166,120

(22) Filed: Oct. 5, 1998

(51) Int. Cl.[7] .............................................. G06F 9/44
(52) U.S. Cl. ..................................................... 717/100
(58) Field of Search ........................... 717/1, 102, 100; 705/8, 1; 709/100, 102, 202; 712/220

(56) References Cited

U.S. PATENT DOCUMENTS

| | | | |
|---|---|---|---|
| 5,402,524 A | * 3/1995 | Bauman et al. ............... 395/50 |
| 5,535,322 A | * 7/1996 | Hecht ............................ 705/1 |
| 5,721,912 A | * 2/1998 | Stepczyk et al. ........... 707/102 |
| 5,734,837 A | * 3/1998 | Flores et al. .................. 705/7 |
| 5,848,271 A | * 12/1998 | Caruso et al. ............. 395/680 |
| 5,860,066 A | * 1/1999 | Rouse ........................... 705/1 |
| 5,870,545 A | * 2/1999 | Davis et al. |
| 5,890,133 A | * 3/1999 | Ernst ............................ 705/7 |
| 5,937,388 A | * 8/1999 | Davis et al. |
| 5,940,829 A | * 8/1999 | Tsuiki et al. |
| 5,974,392 A | * 10/1999 | Endo ............................ 705/8 |
| 5,978,836 A | * 11/1999 | Ouchi |
| 6,088,679 A | * 7/2000 | Barkley |
| 6,122,633 A | * 9/2000 | Leymann et al. |
| 6,237,020 B1 | * 5/2001 | Leymann et al. |
| 6,256,651 B1 | * 7/2001 | Tuli ........................... 715/526 |
| 6,279,009 B1 | * 8/2001 | Smirnov et al. |
| 6,308,163 B1 | * 10/2001 | Du et al. ....................... 705/8 |
| 6,321,133 B1 | * 11/2001 | Smirnov et al. ............ 700/100 |
| 6,321,207 B1 | * 11/2001 | Ye .................................. 705/8 |
| 6,338,074 B1 | * 1/2002 | Poindexter et al. |

OTHER PUBLICATIONS

"Workflow Management Coalition Workflow Client Application" The Workflow Coalition, Nov. 1, 1997.*
"A Common Object Model", The Workflow Management Coalition, Jan. 1998.*
"Workflow Management Coalition The Workflwo Reference Model", Jan. 19, 1995.*
"Database System Concepts Second Edition", H. Korth et al., Chapter 7, 1991.*
Template Software Rolls Out Corporate Product Growth Strategies at Solutions '97 Conference, PR Newswire, Apr. 3, 1997.*
Template Software Strengthens Core Product Family With Ease–of –Use and Functional Enhancements that Promote Unparalled Software Reuse, PR Newswire, Jun. 23, 1997.*

(List continued on next page.)

*Primary Examiner*—Todd Ingberg
(74) *Attorney, Agent, or Firm*—Staas & Halsey LLP

(57) ABSTRACT

A workflow processing framework provides common objects and business processes for the creation of an enterprise-wide workflow processing system. Conventional workflow, database and other platforms are accessed using standardized protocols. The use of common objects providing robust functionality while being insulated from the specific platforms used to implement the workflow processing system enable the common objects to be reused to perform many functions in many different lines of business without modification. If necessary, foundation objects are written to utilize the existing platforms more fully than permitted by standardized protocols. The business processes are generalized as much as possible, but are customized as required to fit the enterprise environment.

25 Claims, 9 Drawing Sheets

OTHER PUBLICATIONS

"Workflow Management Coalition The Workflow Reference Model" Document No. TC00–1003, David Hollingsworth, pp. 1–55, Jan. 19, 1995.*

SNAP Foundation Template, Using the SNAP Permanent Storage Component, Jun. 1997.*

Workflow Template Process Template Using the WFT Development Enviornment, Sep. 1997.*

Workflow Template Process Template Developing a WFT Workflow System, Sep. 1997.*

Principles of Object–Oriented Analysis and Design, James Martin, Jun. 1992.*

Software Design Methods for Concurrent and Real–Time Systems, Hassan Gomaa, Chapters 1–3, Jul. 1993.*

* cited by examiner

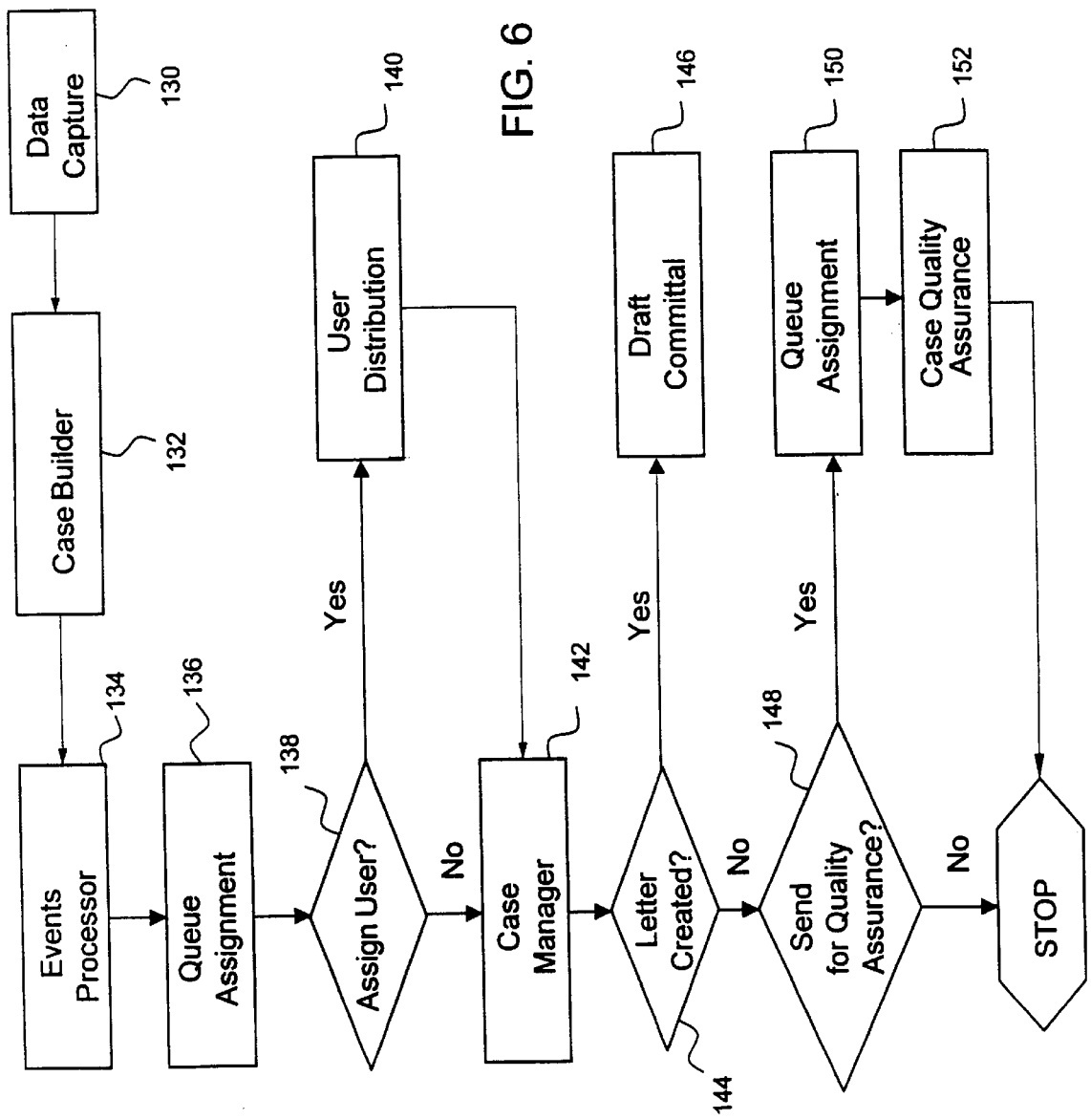

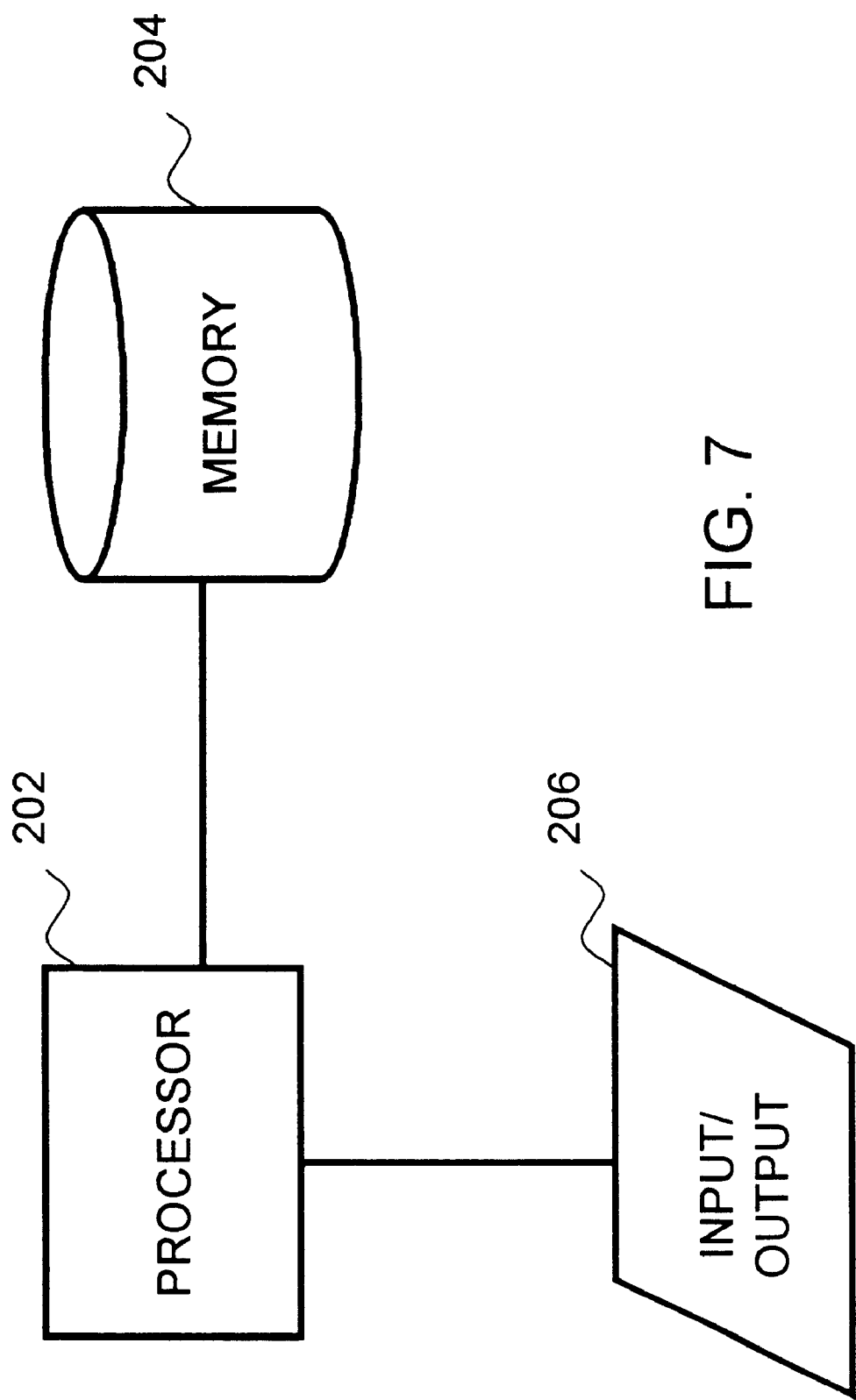

DEVELOPMENT FRAMEWORK FOR CASE AND WORKFLOW SYSTEMS

BACKGROUND OF THE INVENTION

1. Field of the Invention

The present invention is directed to automated workflow systems and more particularly, to an object-oriented framework used in developing and implementing consistent workflow systems in a single department or throughout an enterprise, such as a corporation or a government agency.

2. Description of the Related Art

Computer programs have been written for businesses since the 1950's and 1960's using first machine code, then assembly languages, COBOL, and third, fourth and fifth generation languages. Most work in offices uses at least one and often several computer programs, including languages and software tools that are used in many different industries, such as word processing, spreadsheets, databases, etc., to industry-specific or line-of-business programs, many of which are used to manage the work performed in a specific industry or within certain parts of an industry. In the 1980's, imaging began to be used to support line-of-business programs, reducing the amount of paper required to perform the business functions by storing the paper image in the computer as part of the business program. In the late 1980's, companies such as FILENET, IBM, WANG, etc., developed workflow products of various types. At first, workflow processing products were added to imaging systems in an effort further the "paperless office". Workflow was attached to image-enabled systems because the presence of the electronic image (as opposed to the paper document) allowed the workflow system to "push" work to users in addition to using "pull" technology. With an electronic image, the image could be presented to the user when the work was pushed to them; if paper was required, pushing work to an individual required that the individual then physically retrieve the paper when the work item was pushed to them. Workflow systems developed along several dimensions: "collaborative workflow" was developed to support ad hoc workflow requirements—where the knowledge worker developed a workflow based on the characteristics of each business case; "embedded workflow" was developed to support simple workflow requirements that are a required part of business systems; and "mission critical" workflow was developed to support high volume, predictive workflows.

Management of "mission critical" work in an organization requires significantly more than the features provided by embedded and collaborative workflow systems. A type of workflow processing system termed "utility" systems combine complex process rules stored in a database, existing system interfaces, and user interfaces that control what is available to a worker at a computer workstation or terminal, and may monitor the work being performed.

Three types of utility workflow processing products have evolved. The first products that were commercially available were development languages developed to support workflow. Instead of using general development languages (e.g., COBOL, BASIC, FORTRAN), these workflow languages were developed to facilitate the programming of work processes, much as specialized development languages were developed for such functions as artificial intelligence (e.g., LISP) and process manufacturing. Examples of these "general purpose" workflow languages include FILENET'S VISUAL WORKFLO, IBM's FLOWMARK, and STAFFWARE'S STAFFWARE. Some of these products support a wide range of capabilities and functions for the enterprise, some are focused on a smaller set of functions and smaller user implementations.

The other two types of utility workflow that have evolved include workflow that is specific to a line-of-business or application and workflow that has been added to a suite of business applications. Examples of the former include templates for various financial applications from PEGASYSTEM, mutual fund applications from DST SYSTEMS, Inc, and BANCTEC'S PLEXUS-applications for the financial services industry. In these applications, business specific workflow rules and processes are provided as a full or partial solution (often referred to, respectively, as a package or a template). Some of these solutions are built using general purpose workflow development languages, some have been built using custom workflow languages. The workflow supported by this class of systems is typically hardcoded (necessitating coding changes to programs written in general purpose programming or workflow languages when changes are required) and supports only the specific workflow functionality required by the application. However, even if the workflows are offered for a range of business functions, they do not utilize the same process definitions and code; at best they reuse the code, at worst the code is unique for the line of business.

Examples of the third type of workflow solution include financial and enterprise resource planning (ERP) suites such as those from ORACLE, BMN, and SYSTEMS, APPLICATIONS, AND PRODUCTS in Data Processing (SAP). These application suites often share data and functions across the lines of business, but only support rudimentary workflow functions and should not be characterized as mission critical workflow. They are included in this category only because they are marketed as mission critical solutions.

The state of the art is that there are powerful workflow toolsets that require specific products to support their use and enable a user to create a customized workflow processing system with significant effort. There are also many products designed for specific applications within an industry that can be customized with varying amounts of effort. Examples in the claims processing area include QUICK START for Data Entry from AMERICAN MANAGEMENT SYSTEMS and similar products from IPD, IMAGE MATRIX, and others.

However, there are no scalable products designed to provide standardized workflow processes in a department or throughout an enterprise, that are applicable across industries; provide the coding efficiency of object-oriented design; and utilize open standards to work with existing third party tools and languages, such as databases, graphical user interface languages, etc., currently in use or desired to be used by the organization implementing the workflow processing system.

SUMMARY OF THE INVENTION

It is an object of the present invention to provide a framework for developing a workflow processing system using object-oriented design principals to minimize coding effort and maintenance requirements in implementation in individual departments and throughout an enterprise.

It is another object of the present invention to provide a workflow processing framework utilizing existing third party tools and languages through adherence to standards and an open architecture.

It is a further object of the present invention to provide a workflow processing framework that enables users to define logical queues through dynamic work divisions without requiring coding changes to programs written in programming languages.

It is a yet further object of the present invention to provide a workflow processing framework that can operate on folders containing any type of data accessible in electronic form and prefetch the data without requiring knowledge of how to access and utilize the specific type of data by the user defining what is included in a folder.

The above objects can be attained by a workflow processing framework, scalable for use by a single department to an entire enterprise, including a set of software objects, each unique throughout the enterprise, to support corresponding business functions; a database, accessed by a subset of said software objects, defining work taxonomy and work steps for workflow processing; and a workflow engine utilizing said software objects and the work taxonomy to perform the workflow processing. The workflow processing framework can be used to develop a workflow processing system by entering data into the database to define work types and work steps for workflow processing, creating a graphical user interface (GUI) to use the set of objects, and defining the workflow in the workflow engine.

These together with other objects and advantages which will be subsequently, apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a flowchart illustrating an example of workflow processing according to the present invention.

FIG. 7 is a block diagram of a workflow processing system according to the present invention.

DESCRIPTION OF THE PREFERRED EMBODIMENTS

There are several drawbacks in the state of the art of workflow processing development systems. Existing toolsets can be used to generate many types of systems, but the effort required for an entire enterprise would be only a slight improvement over using general purpose programming languages from scratch since many workflow functions would need to be built for each and every individual application. Existing template products are similarly designed for small-scale applications and are not powerful enough to serve a variety of workflow processing applications throughout an enterprise. Many of the currently available products are generally proprietary in nature, i.e., they are easily used only with products from the same vendor or a small number of third party vendors or in specific lines-of-business. The remaining products were designed with such a narrow focus that the products cannot easily be scaled to serve a variety of types of workflow processing.

Figure 1:
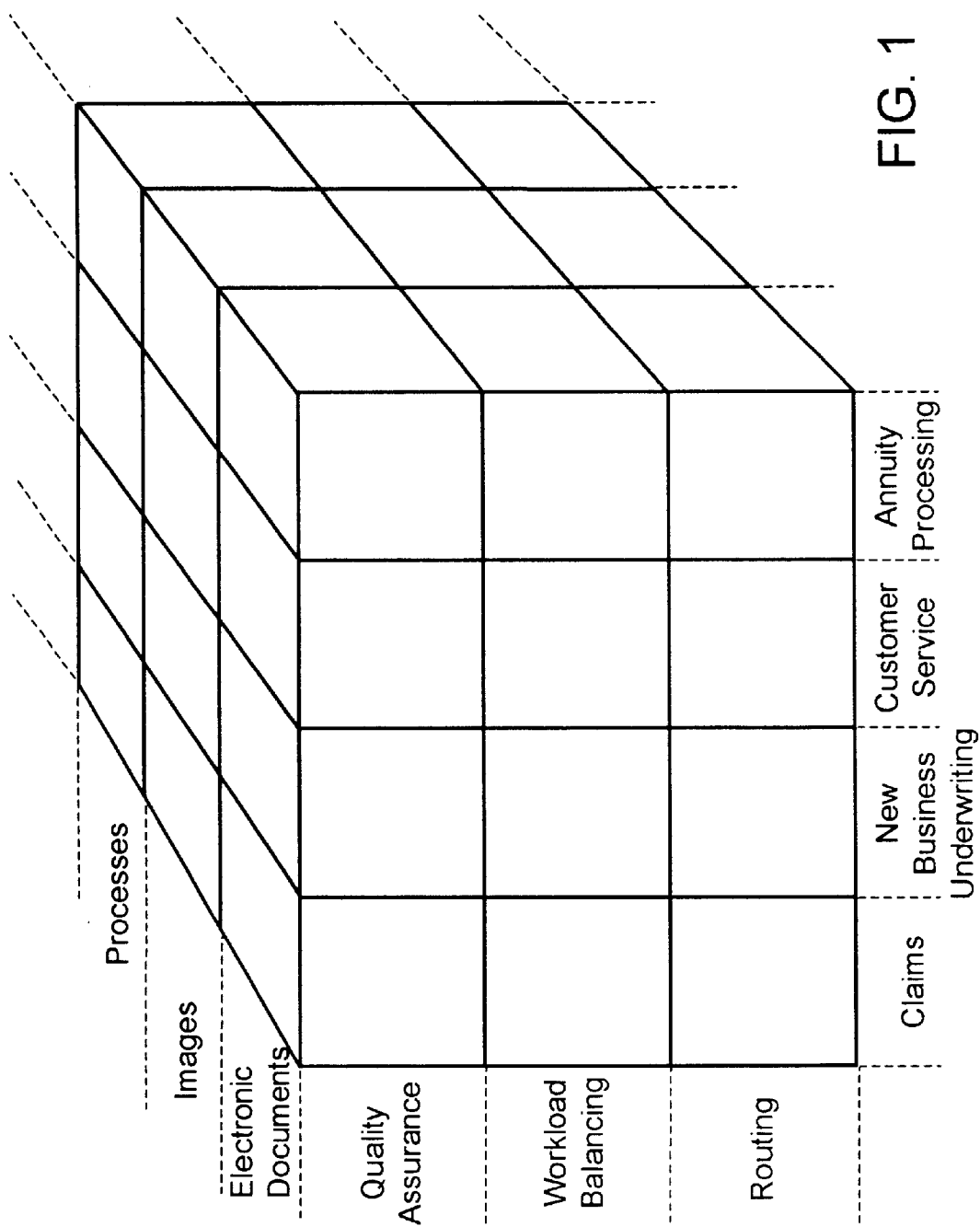
FIG. 1 is a three-dimensional illustration of types of applications, types of functions performed in each application and information used in carrying out those functions in a workflow processing system.

The three-dimensional drawing in FIG. 1 provides an illustration of how limited prior art workflow processing systems are compared to the present invention. Along the horizontal axis are examples of four different workflow processing systems that have been developed for the insurance industry. The illustrated examples of "line of business" functions, are processing of insurance claims, new business underwriting, customer service and annuity processing. Examples in other industries are credit card fraud processing, credit application processing, medical records processing, dispute processing, etc. Illustrated along the vertical axis are some of the functions typically performed by these existing systems: routing, workload balancing, and quality assurance.

As in the case of "line of business" products, the prior art includes cross-functional workflow processing systems like those arranged along the vertical axis. Generic accounts payable systems are available in the form of templates from Unisys and Crowe Chisek. Similarly, workflow processing systems capable of being used for call centers are available from Pegasystems and Mosaix as well and routing products are available from middleware vendors such as Hewlett-Packard and Early Cloud (now owned by IBM).

Typically, the data operated on by workflow processing systems is determined when the workflow processing system is designed and is limited to a few types, such as database records, electronic documents, e.g., word processing documents, and images, such as TIFF Level 4, GIF, JPEG, etc. for images, CAD drawings, medical X-rays, etc. As described below, the present invention is designed to handle all known data types and is flexible enough to add additional data types with minimal changes to the framework of objects used by the present invention.

If existing prior art systems were mapped onto the three-dimensional drawing illustrated in FIG. 1, the systems would use only two dimensions and fill a small amount of space in those dimensions. For example, an insurance claims workflow processing system would include the functions of automated work distribution, document rendezvous, work step division, and letter generation. Similarly, an accounts payable system might be limited to electronic documents and images of the types of data illustrated in FIG. 1, depending upon how it is designed, but would be unlikely to include data records, audio or video.

The present invention uses a set of software objects, each uniquely performing a corresponding function in a workflow processing system and a set of process definitions, accessed by a subset of the software objects, to provide a flexible workflow processing system that can be expanded in any of the three directions illustrated in FIG. 1. The software objects are designed to be generic and provide robust functionality. Tables are used to specify the functions performed by the objects. This design enables the framework to be expanded easily in any of the three directions illustrated in FIG. 1. Objects in the core are sufficiently generic so that they can be used in workflow processing systems for any line of business that can be mapped to a case paradigm. The functionality provided by the objects is broad enough to apply to many different line-of-business functions, including the three horizontal applications illustrated in FIG. 1, as well as child welfare case processing, telephone bill presentment processing, health claims processing, dispute processing, fraud recovery processing, new application processing, return mail processing, and many more. Additional processes are written around the core of objects to customize a workflow processing system for a specific enterprise environment, as discussed with respect to FIG. 2.

Figure 2:
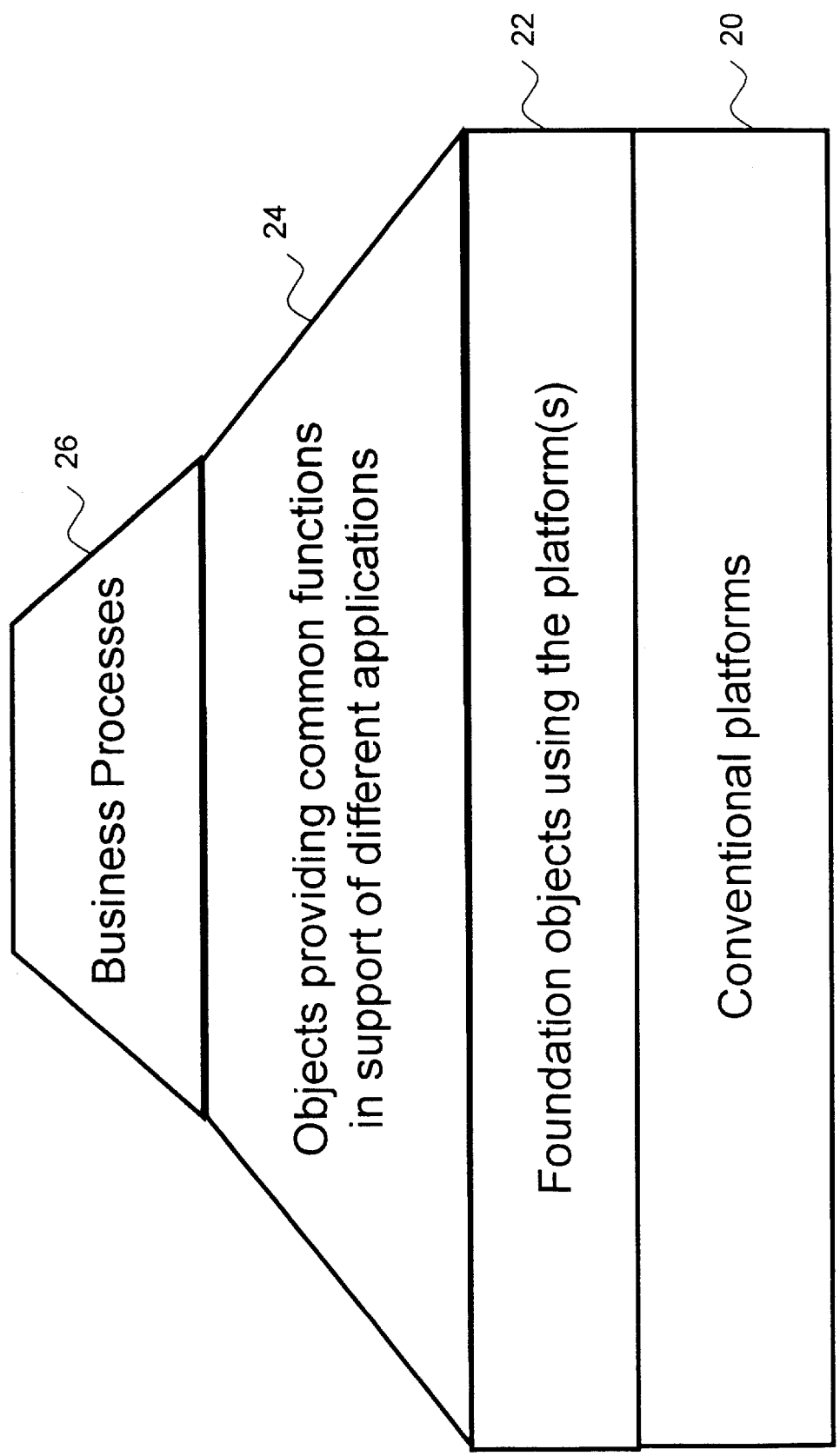
FIG. 2 is an overview of the application program code in a workflow processing system according to the present invention.

The relationship between the objects in a workflow processing framework according to the present invention and the peripheral processes is illustrated in FIG. 2. At the bottom level are conventional platforms 20. Examples of platforms that may be used to support workflow processing include a workflow engine, like FileNET Visual WorkFlo, development languages, databases or data warehouses, existing imaging systems, existing systems of record, etc. These conventional platforms 20 may run on any type of computer system that has communication capability, including Windows, UNIX, or any mainframe operating system. A set of foundation objects 22 access the conventional platforms 20 using standardized protocols whenever possible. For example, the framework preferably uses Distributed Component Object Model (COM/DCOM) in a Microsoft Windows 32-bit operating system to communicate with the workflow and imaging engines using FileNET Panagon and databases using ActiveX Data Objects (ADO). DCOM enables the workflow processing system to create and interact with software objects on separate computers in a programming language neutral and operating system neutral manner.

The foundation objects 22 are illustrated separately from the objects 24 providing common functions in support of different applications, because in a specific enterprise environment standardized protocols may not be available and the foundation objects may need to be modified to utilize conventional platforms 20 existing in the enterprise environment or previously selected for use with the workflow processing system. For example, in the exemplary embodiment of the present invention described below, FileNET Visual WorkFlo is used as the workflow platform included in conventional platforms 20. However, only the foundation objects 22 have to be changed to accommodate the use of a different workflow platform.

The objects 24 providing common functions in support of different applications provide "foldering" of materials (such as electronic documents, images, data records, etc.) used by each case and workflow function, including folder manipulation, rules based folder queuing and subsequent retrieval, distribution, event triggering, etc. Business processes 26 written in conventional programming languages perform enterprise specific functions. The business processes 26 may be written in a variety of programming languages, such as Microsoft Visual C++, Microsoft Visual Basic, Sybase PowerBuilder, or Active Server Pages (ASP). A graphical user interface (GUI) is included in the business processes 26, so that a human worker using the workflow processing system is presented with a computer desktop display consistent with other programs in use at the enterprise. Business processes 26 preferably include modules that can be reused in many enterprises with very little customization. The use of tables, as described below, minimizes the amount of customization of many of the business processes 26. The architecture illustrated in FIG. 2 is used to support different applications. Different applications and different users would utilize different subsets of the business processes 26, common objects 24, foundation objects 22 and conventional platforms 20.

Figure 3:
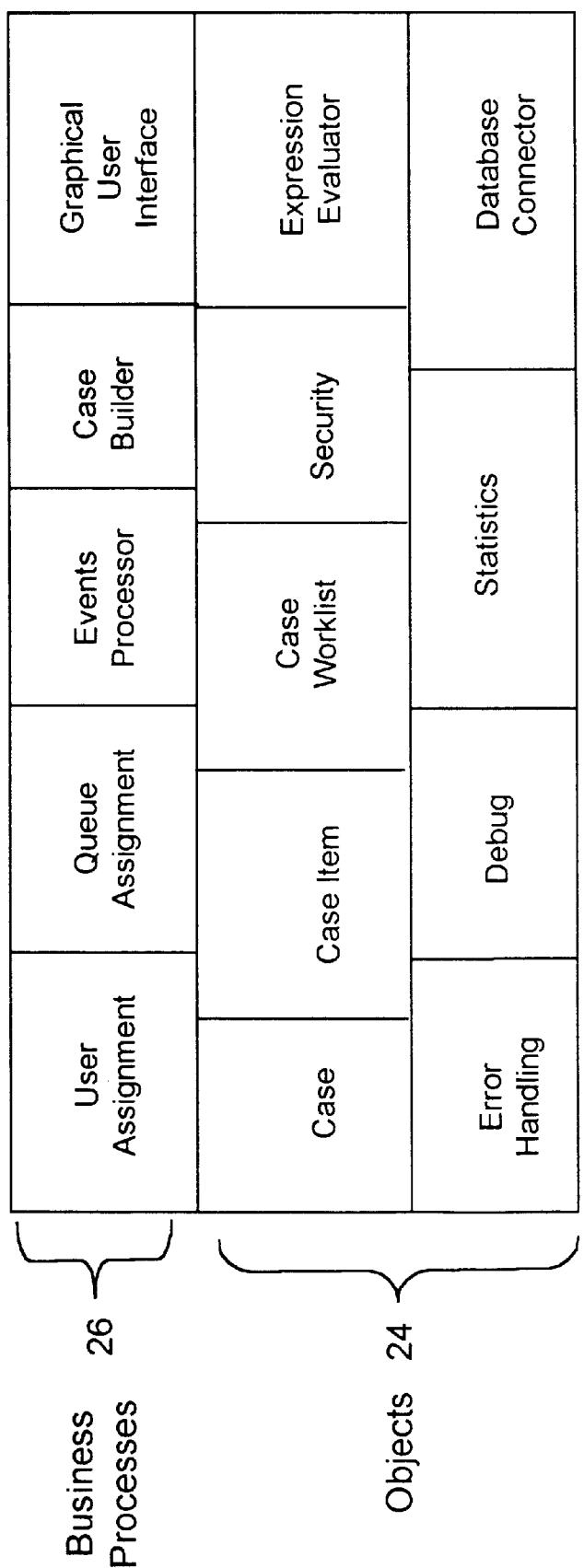
FIG. 3 is a more detailed block diagram of the objects and business processes in a workflow processing framework according to the present invention.

Common objects 24 and business processes 26 are illustrated in more detail in FIGS. 3 and 4A–4C. A hierarchical diagram showing the relationship of the common objects 24 and foundation objects 22 is provided in FIGS. 4A–4C. FIG. 3 provides an overview of common objects 24 and business processes 26. In the preferred embodiment, the workflow processing framework uses the case paradigm and thus, the first three objects in the middle row are Case Session, Case, Case Item and Case Worklist. As described below, with reference to FIGS. 4A and 4B, Case Item is preferably included in the Case class, but is such an important object that it is included in FIG. 3. Other common objects include Security, Expression Evaluator, Error Logging, Debug Logging, Statistics Logging, and DataBase Connector. Foundation objects 22 that are product/vendor specific are called by some of these objects, such as Database Connector and possibly Error Logging if there are standards set by the enterprise for how errors are handled. The common objects are described below in more detail with respect to FIGS. 4A–4C.

Business processes 26 are preferably C++ modules that may need to be modified in a specific enterprise environment. Starting on the right of the top row in FIG. 3, the Graphical User Interface will almost always be further developed when a workflow processing system according to the present invention is implemented, so that the user interface is customized for the specific enterprise environment. As described below in the example illustrated in FIG. 6, the remaining business processes 26 use tables to minimize the amount of customization required, but may require, modification depending upon the type of information and how the information is handled. These tables essentially contain rules on how the data is handled and thus, the Queue Assignment module can be considered specific implementations of a rules processor. The Case Builder module embodies specific business rules through customization. The Events Processor module matches incoming events with pending events by comparing event code values customized for each business. The User Assignment module provides balanced distribution of work based on each user's load factor stored in a database table.

The following description of these business processes is done in context of a typical workflow system. The Case Builder is used to determine either when to create a new case or when and how to rendezvous an incoming document with an existing case folder. The Events Processor, on the other hand is executed whenever an event occurs that requires a change in workflow. An event can be any change by a worker (user of the workflow processing system) or system module, or the expiration of a timer. The Events Processor is scheduled at intervals throughout the workflow. One of the events that the Events Processor executes is the creation of a new case from Case Builder. After the Events Processor has determined the reason for moving the case folder through the workflow, Queue Assignment is executed to determine in which work step division the case should be processed. Finally, if the workflow processing system requires that the determined work step division should have users assigned to the cases, the User Assignment module is executed.

Figure 4A:
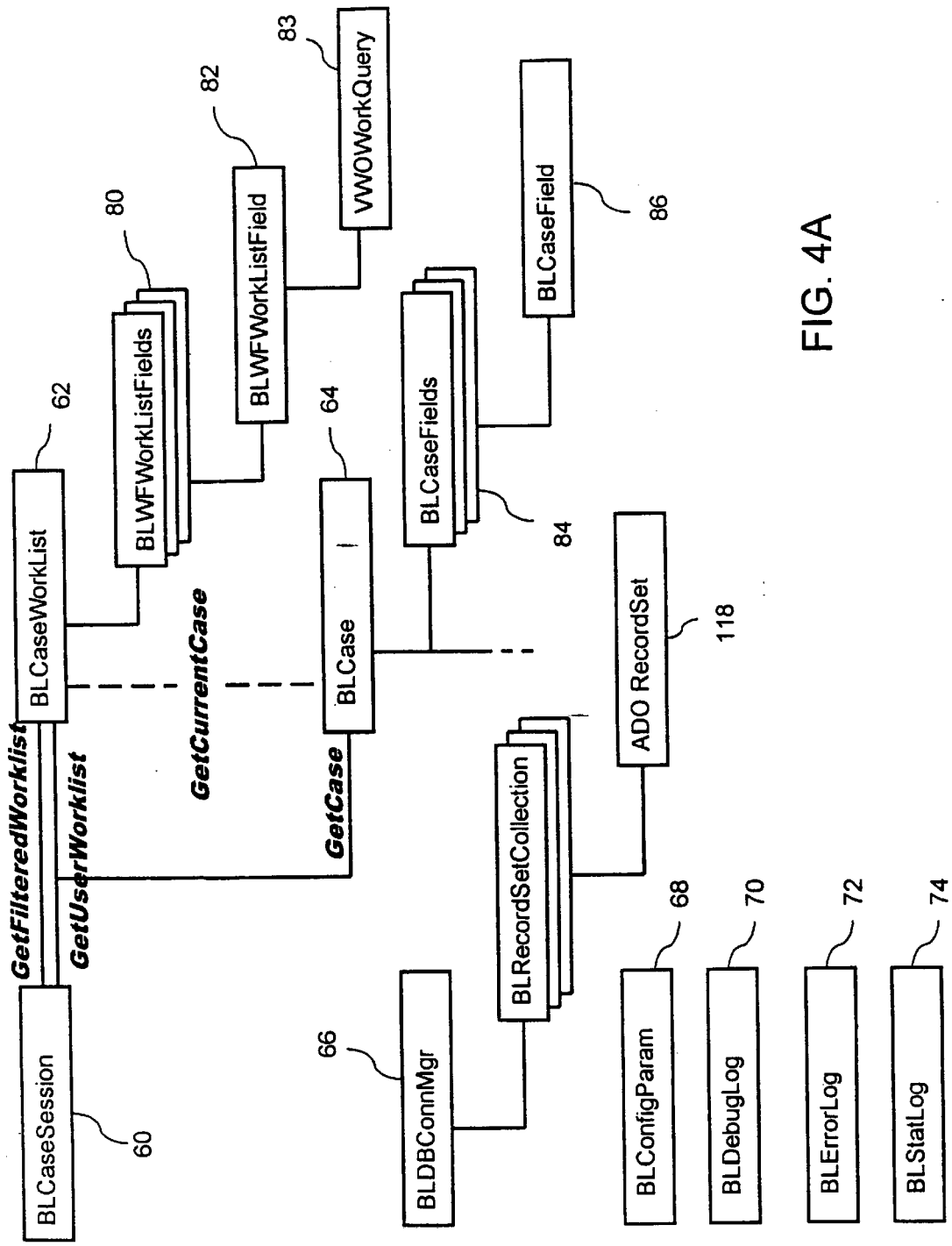
FIGS. 4A-4C are a hierarchical diagram of objects in a workflow processing framework according to the present invention.
Figure 4B:
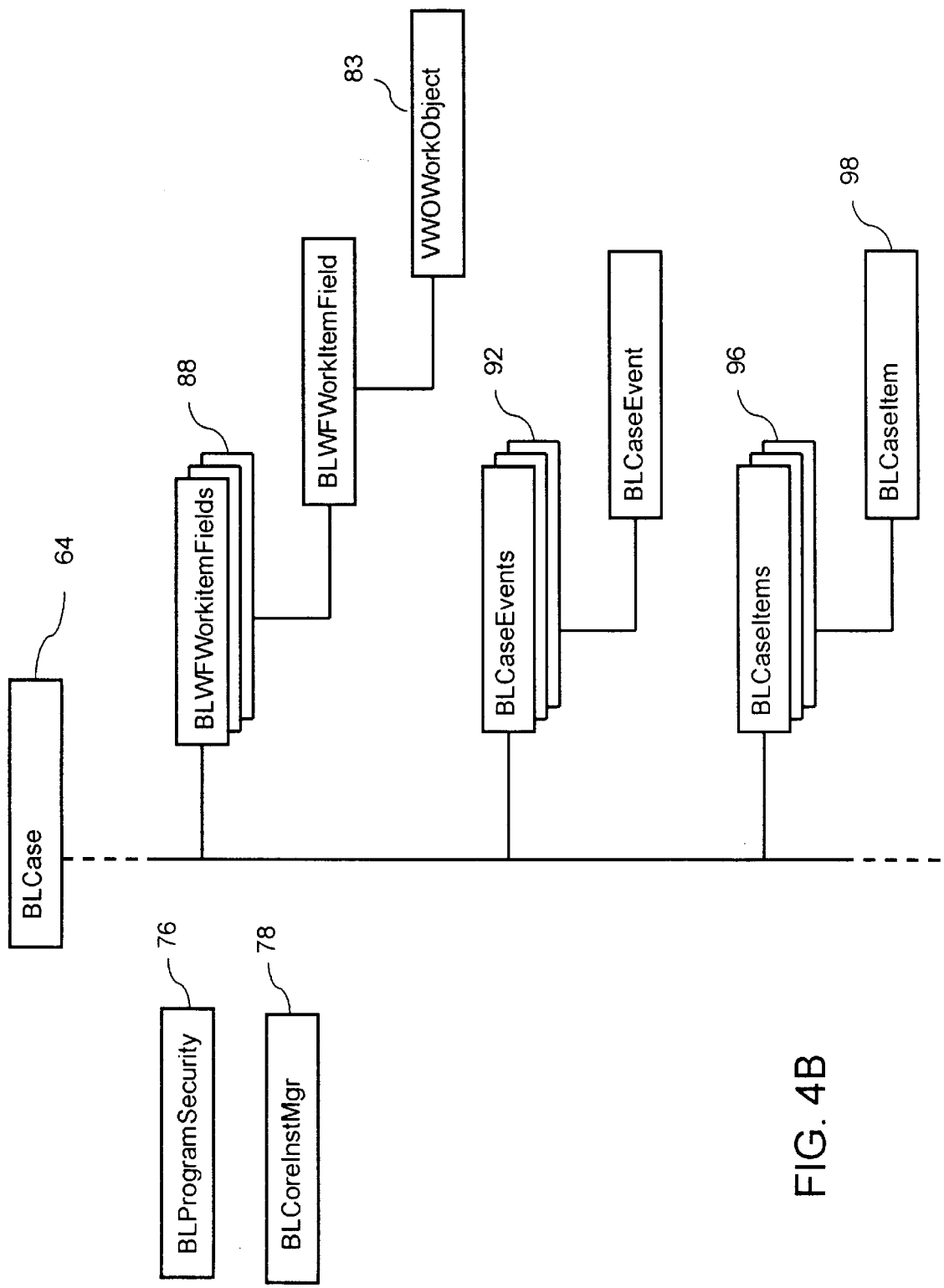
Figure 4C:
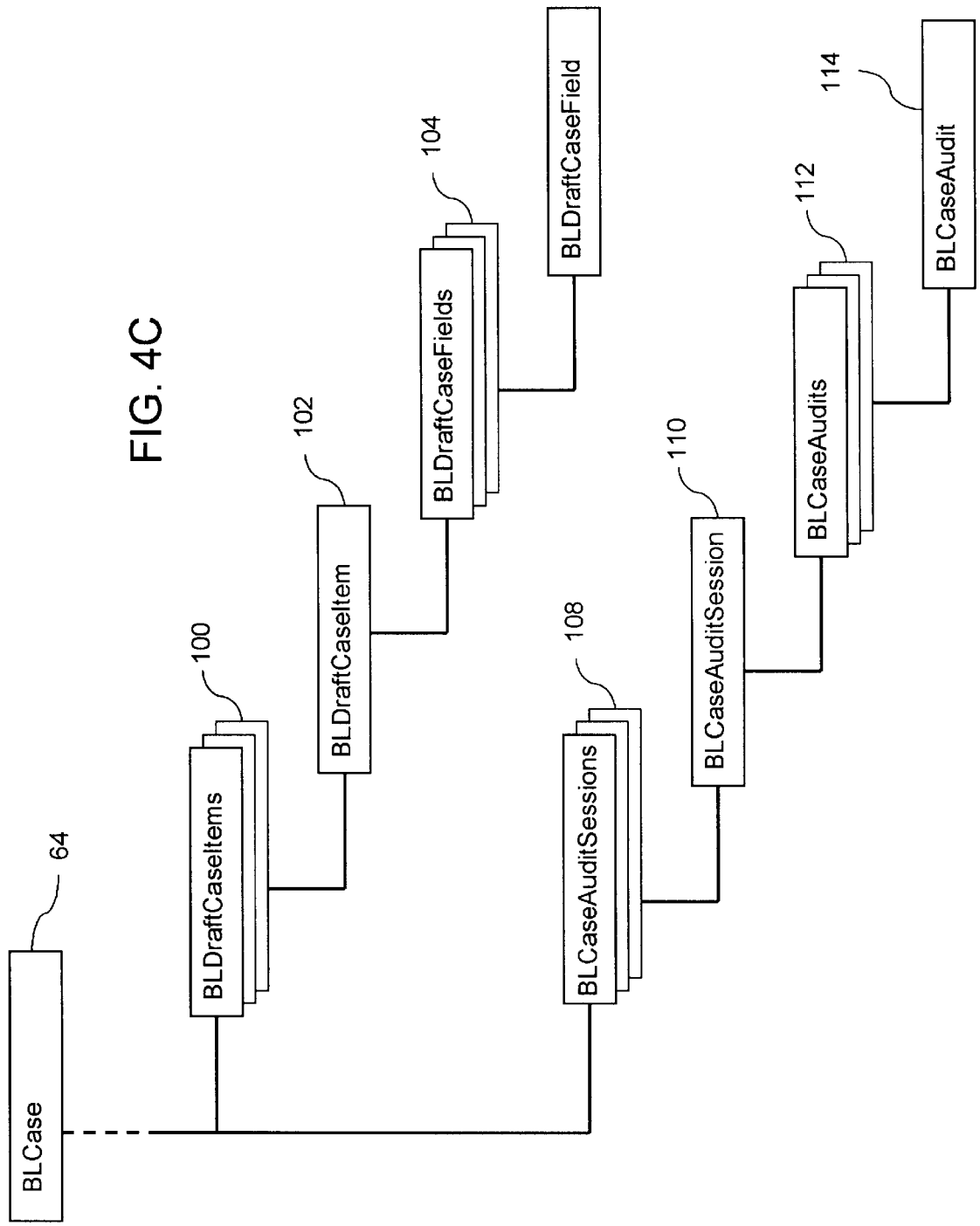

As illustrated in FIGS. 4A–4C, most of the common objects 24 are collected in a parent object BLCaseSession 60. The two basic functions performed by the common objects are GetFilteredWork-List, GetUserWorkList and GetCase which results in the creation of BLCaseWorkList 62 and BLCase 64 objects. The other objects at the same level as BLCaseSession 60 include BLDBConnMgr 66 which provides access to databases in the conventional platforms 20 as required by the objects in BLCaseSession 60. The object BLConfigParam 68 provides an interface with the operating system configuration information. In the preferred embodiment, BLConfigParam 68 accesses the Windows Registry to obtain parameters used by the workflow processing system. Next are three objects that perform logging for debugging, error handling and statistics; BLDebugLog 70, BLErrorLog 72 and BLStatLog 74.

Of the final two top-level common objects, BLProgramSecurity 76 and BLCoreInstMgr 78, the first performs an important function in workflow processing and the second is used to manage instances of objects that are created by the workflow processing system. BLProgamSecurity 76 determines the access of an individual user or group of users to functions within the workflow processing system. There are three levels of security. The first type of security is the application with which the user is permitted to work. For example, a typical worker may only use the insurance claim application illustrated in the left hand column of FIG. 1, or the loan applications processing in the next column of FIG. 1, but not both.

The second type of security is the task of the user, e.g., process claim 1, process claim 2. The second type of security is typically used in a situation where a single user interface is created that operates in different modes. In this situation although there are different work steps in the workflow, a single user interface may be used as the work step business application, with its configuration changed for each different mode of operation. The tasks are defined in the tables described later and are identified in a user record. An example of a user record is provided immediately below.

```
BL_USERPROFILE
    SUSERID = juser
    SUSERNAME = Joe User
    BISAVAILABLE = Y
BL_PROGRAMSECURITY
    SUSERID = juser
    SPROGRAMNAME = Claim Processing
BL_TASKSECURITY
    SUSERID = juser
    SPROGRAMNAME = Claim Processing
    STASKNAME = Claim1
BL_FUNCTIONSECURITY
    SUSERID = juser
    SPROGRAMNAME = Claim Processing
    STASKNAME = Claim1
    SFUNCTIONNAME = Write Custom Letter
```

The third level of security is the function within the task. For example, while a function such as Write Custom Letter may be included in an insurance claim application, only certain users might be allowed to access this function. Other workers would be limited to ordinary correspondence processing and customer service functions illustrated in FIG. 1, and perhaps additional functions not illustrated.

BLCaseWorkList 62 retrieves a prioritized worklist for a user when a worker starts a session with a workflow processing system according to the present invention. The next case can be retrieved while simultaneously processing the current case by user interaction through a client/server GUI environment. Ordinarily a user will require a few minutes to process the work item. During that interval BLCaseWorkList prefetches the next case to the client workstation of the user. This limits the idle time of employees between and during cases and increases the output of the employee.

BLCaseWorkList 62 is a multi-threaded COM object that operates in a producer-consumer environment. This object keeps track of the current and next case objects using semaphores, threads, and class member variables. The consumer thread is the normal user thread of BLCaseWorkList 62. From the consumer thread the current case is obtained from the list. The producer thread executes as long as BLCaseWorkList 62 exists in memory. Whenever the next case object is NULL, the producer thread retrieves the next available case from the database. Whenever the next case object exists, the producer thread does not try to get another case until the current case is retrieved into processing by the consumer thread.

Whenever a case is retrieved from the database platform in conventional platforms 20, a prefetch of that case is completed. The prefetch function has an enumerated type which allows the system to determine what components of the case need to be prefetched. The enumerated type allows the system to filter (include or exclude) each case level component type individually in the prefetch operation. This prefetch filter value is set during worklist construction as part of the system implementation. For example, a system implementer can choose to have the case documents and the case audits prefetched, but not the case events. This enables the prefetch requirements to be tailored to the environment of each specific implementation.

The worklist is determined based on user identification obtained when the worker logs into the computer system on which the workflow processing system is running. BLCaseWorkList 62 calls a collection of objects named BLWFWorkListFields 80 formed of objects each named BLWFWorkListField 82. An object is called by BLWFWorkListField 82 to access the workflow engine. The object used will depend on the workflow engine included in the conventional platforms 20. In the example illustrated in FIGS. 4A–4C, VWOWorkQuery 83 accesses the Visual WorkFlo to obtain information in the workflow platform identifying the fields used by a case, such as the name of the worker, the case number, the case type, the event that caused the case to enter the workflow, the dollar amount, etc.

Once a worklist has been obtained, the user can select one of the cases on which to work. The GetCase function is called by BlCase Session and returns an object called BLCase 64. The BLCase object 64 contains several collections of objects to obtain the case information. BLCaseFields 84 is a collection of objects containing the information for a case obtained from the database platform in conventional platforms 20. For example, the information for: an insurance claim may include case identification number, incident number, date of incident, name of insured, claim dollar amount, type of claim, etc. BLWFWorkItemFields 88 is a collection of objects containing information identifying where the case is in the workflow. The information in BLWFWorkItemFields 88 is obtained from the workflow platform in conventional platforms 20.

BLCaseEvents 92 is a collection of objects containing information regarding events that have or will occur during the existence of a case. The events are defined during each system implementation. For example, the receipt of a document in a case, the creation of a new case, and the expiration of an event tied to a time period may be defined as events in a system. Each system implementation is allowed to create its own events by writing an event code to the BL_CaseEvent table by using BLCase.AddPendingEvent or BLCase.AddReceivedEvent. The Events Processor does not need to be modified when new event codes are added. The received event codes are matched with the pending event codes by the Events Processor. As long as the programs writing the event code to the Events Processor are synchronized such that the program writing the pending event writes the same event code as the program writing the received event, the Events Processor will recognize and process the events. The information contained in BLCaseEvents 92 is obtained from the database platform in conventional platforms 20, in a manner similar to that used by BLCaseFields 84.

The next two objects illustrated in FIGS. 4A–4C are items in a case folder. BLCaseItems 96 represents items that will not have different versions. In the preferred embodiment optical storage is used for the data and each BLCaseItem 98 obtains the information by accessing the optical storage by calling an imaging system object specifically for the type of optical storage unit used in the system. BLDraftCaseItems 100 are documents related to the case that are in process of being created and for which there may be different versions that do not need to be saved on optical storage until the final product has been determined. The information in each BLDraftCaseItem 102 is obtained from the conventional platforms 20 using the BLCase Object. BLDraftCaseFields 104 are the data values stored with a BLDraftCaseItem 102 when the item becomes permanent.

In addition to calling the objects illustrated in FIGS. 4A–4C, BLCase 64 also uses several methods to perform operations itself. BLCase.AddNewItem and BLCase.AddNewDraftItem are used to create a new BLCaseItem 98 and a new BLDraftCaseItem 102, respectively. BLCase-WorkList.Prefetch performs the prefetch operations described above. BLCase.AddPendingEvent and BLCase.AddReceivedEvent are used to create events, as described below.

BLCaseAuditSessions 108 are a collection of objects used to keep track of work performed on a case during the sessions on which the case is worked. BLCaseAudits 112 are a collection of objects containing information about the actions taken during a session. What information is stored in each BLCaseAudit 114 can be determined when the workflow processing system is implemented.

The workflow platform in the conventional platforms 20 includes a definition of what information will be captured by BLCaseAudits 112. In the Visual WorkFlo system used in the exemplary embodiment, the definition of what information will be stored in BLCaseAudits 112 is determined by each individual system implementation, BLCaseAudit 114 defines the interface to write the audits. Each business application must define and write its own data to the audit log.

As an example, a user can suspend a case awaiting a signature document using a module like the Case Manager described below with reference to FIG. 6. The Case Manager module calls the BLCase.AddPendingEvent method with the parameters (EventCode="ADD_DOC_SIGNATURE_DOC", EventDescription="Signature Document", Expire="current date+10 days", GroupID="", GroupEventCode="", OptionalEventData=""). This adds a record to the BL_CaseEvent table that indicates that the case is waiting for a signature document to be received within 10 days or it will be triggered to the user for review. When the document is received, the Case Builder module calls the BLCase.AddReceivedEvent method with the parameters (EventCode= "ADD_DOC_SIGNATURE_DOC", EventDescription= "Signature Document", Received="current date", CaseItemName="Doc ID", OptionalEventData=""). This adds a record to the BL_CaseEvent table that indicates that the case received a signature document. The next time the Events Processor module runs, it matches up the pending and received "Signature Document" event codes and triggers the work object to the user for review.

Preferably graphical user interfaces (GUIs) in a general purpose language like Visual Basic are included in a workflow processing system according to the present invention to provide programmers with the bulk of the code necessary to implement modules like those described above. Examples are Scan, Index, System Maintenance, Case Retrieval, and Document Retrieval interfaces.

After incoming documents are prepared for input and sorted into appropriate batches, operators scan documents in batches into the imaging system. The Scan interface provides a processing window that requires users to enter information specific to the current batch. The user also has the ability to set properties of the scanner. When the mandatory information is entered and the user is satisfied with the settings, the scan processing window allows the user to start and stop the actual scanning process.

The Index interface provides the ability to assign data values to a document for future retrieval. The Scan process dispatches batches to an Index and Reassembly process. When a user starts the Index and Reassembly process, the process retrieves a user work list for that user and the divisions within the Index and Reassembly work step. The process loads the first batch in the user's work list onto the Index and Reassembly window. The process loads the first document of the batch into the image viewer and the document is ready for indexing. The actual index fields displayed for indexing is based on the document class and varies widely with each system implementation. Therefore, the Index process does not implement the index values control which may, for example, be an Active X control developed by the organization that uses the workflow processing system. When a user finishes indexing the document, he/she clicks the index button. The Index process saves the index values for the current document and loads the next document that has not been indexed.

The Index and Reassembly process allows for the reassembly of documents in parallel with the indexing of documents. When reassembling documents within a batch, the user may have the ability to add documents, delete document separators, mark documents for rescan, move pages, copy pages, and paste pages. These capabilities are easily provided when, for example, Visual WorkFlo is used as the workflow engine. The user can view the structure of the batch in the batch reassembly tree to determine whether or not to take these reassembly actions. For example, some fax transmissions are received as one transmission but contain several documents. There is no exact method to determine the document breaks within a single transmission. The indexer reviews each batch and adds new documents as necessary. The indexer can then move pages into the newly created documents.

When the user indexes all documents in the current batch, the process prompts the user to commit the batch. If the user chooses to commit the batch, then the process commits the batch and loads the next batch in the user's work list. If the user chooses not to commit the batch, the user is allowed to continue re-indexing documents or reassembling the batch until the user is ready to commit via the commit batch menu option.

The System Maintenance interface is a program that is customized for each system implementation. While some of the code is very specific to an implementation, e.g., specific edit checks, some things remain the same. There is always a set of baseline tables that have a constant table structureand there is a framework for selecting and displaying table information. Therefore code for these functions is preferably provided by a workflow processing system according to the present invention.

The System Maintenance interface has two basic screens. The first is the main window, which has a picture list-box down the left-hand side and a grid control covering the remainder of the window. The window creates itself dynamically from a set of constant data structures which lists the icon to be shown in the picture list-box as well as the fields in the corresponding table to be show in the grid for that selection. The second window is a sample property-tabbed dialog that the user uses to update any of the values from the grid. No data is actually modified in the grid. BLErrorLog 72, CNativeErrorLog (not shown), BLStatLog 74, BLDebugLog 70, CNativeDebugLog (not shown), BLDBConnMgr 66 and BLProgramSecurity 76 are used.

Document Retrieval is also a commonly requested interface. Although the actual window that users view from implementation to implementation differs, the basics of creating and executing a query against the imaging platform in the conventional platforms 20 are very similar. A workflow processing system according to the present invention preferably provides a program that implements the basics of taking a query and executing it against the imaging platform in the conventional platforms 20.

Document Retrieval (and Case Retrieval) preferably use conventional protocols of the operating system for selecting files. An interface is preferably included in the basic workflow processing system to provide a simple search criteria window. When the user clicks Search, the program preferably uses the workflow engine in the conventional platforms 20, e.g., FileNET's OLEDB provider to retrieve a list of documents using an ADODB.RecordSet object 118 (FIG. 4A). The contents of the record set will fill the expanded window with a grid of document indices. Users may then select a document and view it in the workflow engine's native viewer interface.

Document Retrieval will make full use of the BLErrorLog, CNativeErrorLog, BLStatLog, BLDebugLog, CNativeDebugLog, BLDBConnMgr and BLProgramSecurity objects. The majority of the code will be implemented in a COM object to allow other programs to include Document Retrieval capabilities within their operations.

Although Case Retrieval has slightly more variation from one system implementation to another than Document Retrieval, the basics are still the same. The window in Case Retrieval will look very similar to Document Retrieval. There will be a simple search criteria window allowing the user to enter specific case data values. After clicking search, the main window will expand to show a grid with case data for any matching cases.

The Index, Document Retrieval, and Case Retrieval interfaces are implemented with common functions and features and may be implemented with a basic interface control that provides sample search data capabilities. Each specific implementation modifies this interface control without changing the rest of the application or re-compiling the application.

The GUI can be thought of as a standalone program, a menu option in a case management GUI, or as the beginnings of a Balance WorkLoad process, where managers multi-select from the list of found cases and reassign them or prompt them into the workflow (Unpend any PENDED items).

Case Retrieval makes full use of the BLErrorLog, CNativeErrorLog, BLStatLog, BLDebugLog, CNativeDebugtog, BLDBConnMgr, BLProgramSecurity, BLCaseSession and BLCase objects. The majority of the code is preferably implemented in a COM object to allow other programs to include Case Retrieval capabilities within their operations.

As discussed above, a letter generation wizard is preferably included to provide a graphical user interface that steps a user through the creation of a custom letter. It is usually called from a Case Manager process that is customized for each client. The letter generation wizard interfaces with a word processing program in the conventional platforms 20, such as Microsoft Word. It allows the user to select from a list of letter templates. Once a letter template is selected, the wizard reads the template in, e.g., Microsoft Word, for each bookmark and displays the bookmarks in a window for the user to fill in. The wizard replaces the bookmark values with the provided values and sizes the fields according to user defined size configurations for each field. Macros within the template allow the user to finish the letter and return to the Case Manager process. After the Case Manager process, the work object is sent to the Draft Letter Committal background process which commits the letter to the imaging system and adds the letter to the case folder.

Figure 5:
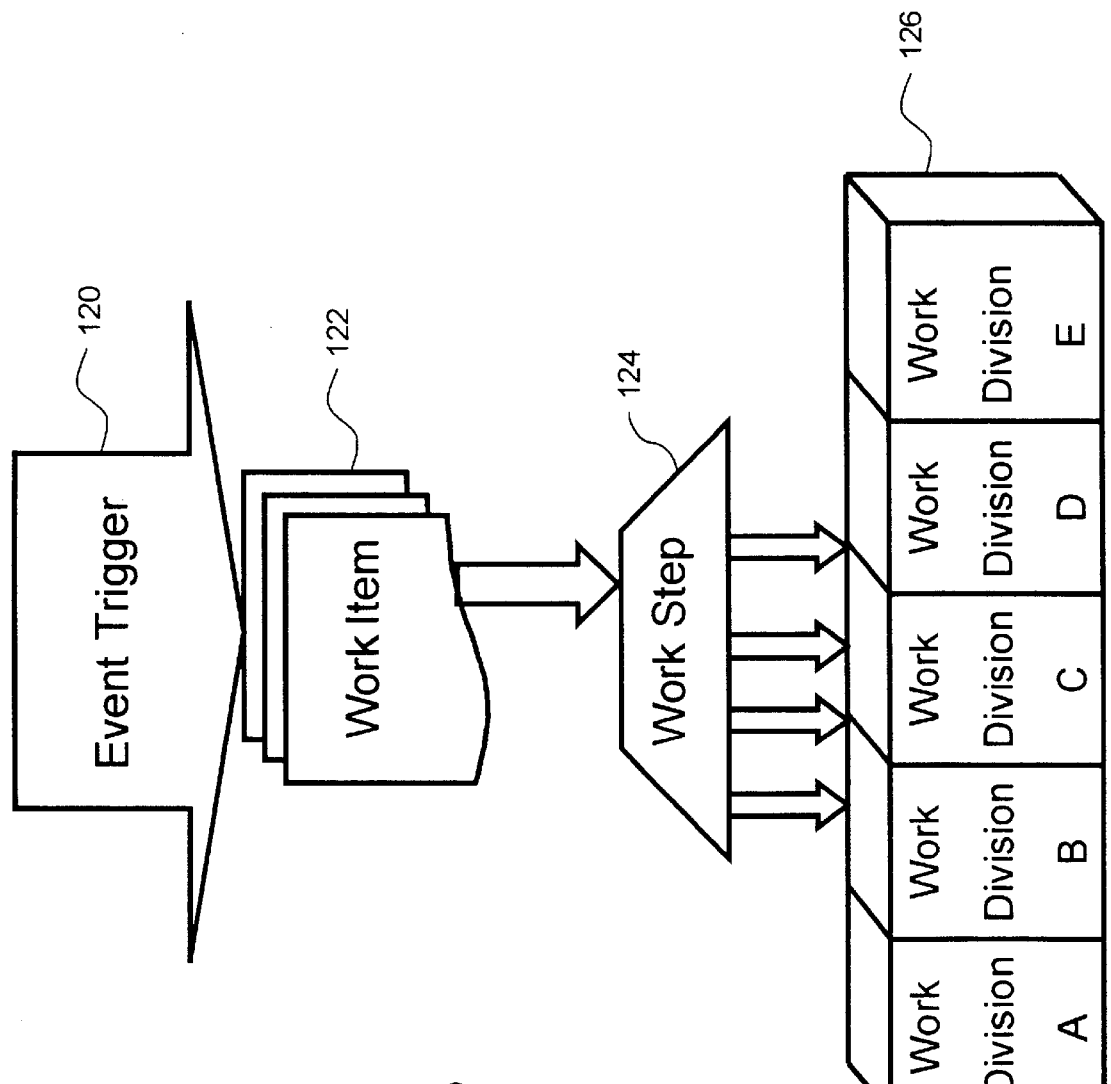
FIG. 5 is a flow diagram of events processing and queue assignment in a workflow processing system according to the present invention.

Illustrated in FIG. 5 is an example of how the Events Processor and Queue Assignment modules operate. When an event is detected, as indicated by Event Trigger 120, the Events Processor determines how the work item(s) 122 associated with the event should be started through the workflow and what data to start in the workflow. The workflow dictates the work step 124. The Queue Assignment module then determines to which work division 126 the work item(s) 122 should be assigned. The configuration tables are used by the Events Processor and Queue Assignment modules to perform these tasks.

One example of tables that could be used in the present invention is provided below. This is merely one example of many possible ways that tables could be used to minimize the extent that programs have to be modified during system implementation.

The Case table (BL CASE) is the main processing table. It stores a record for each case per work type in the system. It is accessed by BLCase 64. There can be multiple case tables in the system. The table structure is always modified for each system implementation. Below is one example.

```
BL_CASE
(
    SCASEID             VARCHAR2(16)    not null,
    SWORKTYPE           VARCHAR2(16)    not null,
    SSTATUS             VARCHAR2(16)    not null,
    SOWNERID            VARCHAR2(16)    null,
    DCREATED            DATE            not null,
    SLASTUPDATEUSERID   VARCHAR2(16)    null,
    DLASTUPDATED        DATE            null,
    SACCOUNTNUM         VARCHAR2(32)    null,
)
```

The Case Event table (BL_CASEEVENT) stores all the received and pending events associated with cases. It is written to and read from by BLCaseEvents 92.

```
BL_CASEEVENT
(
    SWORKTYPE     VARCHAR2(16)     not null,
    SCASEID       VARCHAR2(16)     not null,
    SEVENTCODE    VARCHAR2(32)     not null,
    SEVENTSTATE   CHAR(1)          not null,
    SEVENTDESC    VARCHAR2(256)    not null,
```

```
    DEXPIRE               DATE              null,
    SGROUPID              VARCHAR2(16)      null,
    SGROUPEVENTCODE       VARCHAR2(32)      null,
    SPROCESSINGSTATUS     CHAR(1)           not null,
    DRECEIVED             DATE              null,
    SCASEITEMNAME         VARCHAR2(64)      null,
    SOPTIONALEVENTDATA    VARCHAR2(128)     null,
    DCREATED              DATE              not null,
)
```

The Case Item table (BL_CASEITEM) stores the reference to the items associated with cases. For example, the reference number for documents associated with cases are stored in the table. BLCaseItems 96 accesses the table.

```
BL_CASEITEM
(
    SCASEID               VARCHAR2(16)      not null,
    SWORKTYPE             VARCHAR2(16)      not null,
    SITEMNAME             VARCHAR2(64)      not null,
    SITEMDISPLAYNAME      VARCHAR2(128)     null,
    IITEMTYPE             NUMBER(4)         not null,
    DCREATED              DATE              not null,
)
```

The Draft Case Item table (BL_DRAFTCASEITEM) stores the draft items and data associated with cases. For example, the binary draft documents associated with cases are stored in the table. BLDraftCaseItems 100 accesses the table.

```
BL_DRAFTCASEITEM
(
    SCASEID               VARCHAR2(16)      not null,
    SWORKTYPE             VARCHAR2(16)      not null,
    SDRAFTITEMNAME        VARCHAR2(64)      not null,
    SDRAFTITEMDISPLAYNAME VARCHAR2(128)     null,
    SDOCUMENTCLASS        VARCHAR2(32)      not null,
    SDRAFTITEMTYPE        VARCHAR2(64)      not null,
    SINDEXVALUES          VARCHAR2(2000)    null,
    BITEMDATA             LONG RAW          null,
    DCREATED              DATE              not null,
)
```

The Case Lock table (BL_CASELOCK) stores the cases that are currently locked for processing by any program module. BLCaseSession 60 creates and deletes the case lock records.

```
BL_CASELOCK
(
    SCASEID               VARCHAR2 (16)     not null,
    SWORKTYPE             VARCHAR2 (16)     not null,
    SUSERID               VARCHAR2 (16)     not null,
    DLOCKED               DATE              not null,
)
```

The Case Relationship table (BL_CASERELATIONSHIP) stores the relationship between cases. It is accessed by the BLCase object using the GetChildren and GetParent methods.

```
BL_CASERELATIONSHIP
(
    SCHILDCASEID          VARCHAR2(16)      not null,
    SCHILDWORKTYPE        VARCHAR2(16)      not null,
    SPARENTCASEID         VARCHAR2(16)      not null,
    SPARENTWORKTYPE       VARCHAR2(16)      not null,
    DCREATED              DATE              not null,
)
```

The Case Audit Session table (BL_CASEAUDITSESSION) is the parent table for all audits during a case session. It is accessed by BLCaseAuditSession 110.

```
BL_CASEAUDITSESSION
(
    SWORKTYPE             VARCHAR2(16)      not null,
    SCASEID               VARCHAR2(16)      not null,
    SSESSIONID            VARCHAR2(16)      not null,
    DCREATED              DATE              not null,
    SUSERID               VARCHAR2(16)      not null,
)
```

The Scan Productivity table (BL_SCANPRODUCTIVITY) is a processing table-used to store the statistics to run a productivity report for scan operators. The table records are written by the Scan interface (described below) and are not modified by any other process.

```
BL_SCANPRODUCTIVITY
(
    SBATCHNAME            VARCHAR2(18)      null,
    BBATCHACCEPTED        CHAR(1)           null,
    SUSERID               VARCHAR2(8)       null,
    DRECEIVEDDATE         DATE              null,
    IEXPECTEDCOUNT        NUMBER(3)         null,
    IACTUALCOUNT          NUMBER(3)         null,
    IPAGECOUNT            NUMBER(3)         null,
    SDOCTYPE              VARCHAR2(20)      null,
    DSCANSTARTTIME        DATE              null,
    DSCANSTOPTIME         DATE              null,
)
```

The Index Productivity table (BL_INDEXPRODUCTIVITY) is a processing table used to store the statistics to run a productivity report for index operators. The table records are written by the Index interface (described below) and are not modified by any other process, but are used for reporting purposes.

```
BL_INDEXPRODUCTIVITY
(
    SBATCHNAME            VARCHAR2(18)      null,
    SUSERID               VARCHAR2(8)       null,
    IDOCUMENTCOUNT        NUMBER(3)         null
    INUMBERINDEXED        NUMBER(3)         null,
    INUMBERRESCANNED      NUMBER(3)         null,
    INUMBERADDED          NUMBER(3)         null,
    INUMBERDELETED        NUMBER(3)         null,
    DSTARTTIME            DATE              null,
    DSTOPTIME             DATE              null,
)
```

The Rescan table (BL RESCAN) is a processing table that stores documents that need to be rescanned. The table records are written by the Index interface and are not modified by any other process.

```
BL_RESCAN
(
    SDOCID          VARCHAR2 (8)    null ,
    SBATCHNAME      VARCHAR2 (18)   null ,
    SUSERID         VARCHAR2 (8)    null ,
    INUMBERPAGES    NUMBER (3)      null ,
    SPAGEPOSITION   VARCHAR2 (25)   null ,
    SDOCTYPE        VARCHAR2 (20)   null ,
    DRESCANTIME     DATE            null
)
```

The Document Type table (BL_DOCTYPE) stores the valid business document types and their associated scan settings. This table is accessed by the Scan and Index graphical user interfaces. The Scan and Index interfaces use the table to provide a list of valid document types to the user. Once a valid document type is chosen, the Scan program looks up the associated settings and template to which to attach the scan batch. This table can be modified by business users through the System Maintenance interface (described below).

```
BL_DOCTYPE
(
    SDOCTYPE    VARCHAR2 (20)   not null ,
    SSETTINGS   VARCHAR2 (20)   not null ,
    STEMPLATE   VARCHAR2 (20)   null    ,
)
```

The Case Audit Detail table (BL_CASEAUDITDETAIL) stores audit records created for each case. It is accessed by BLCaseAudit 114.

```
BL_CASEAUDITDETAIL
(
    SSESSIONID      VARCHAR2(16)    not null,
    DCREATED        DATE            not null,
    SCATEGQRY       VARCHAR2(16)    not null,
    SACTION         VARCHAR2(16)    not null,
    SDESCRIPTION    VARCHAR2(512)   null,
    SAUDITDETAIL1   VARCHAR2(64)    null,
    SAUDITDETAIL2   VARCHAR2(64)    null,
    SAUDITDETAIL3   VARCHAR2(64)    null,
)
```

A set of baseline tables need to be configured for each implementation of the present invention. Each system implementation builds upon this framework to add its own tables. The baseline tables that need to be configured are:

```
BL_USERPROFILE
BL_PROGRAMSECURITY
BL_TASKSECURITY
BL_FUNCTIONSECURITY
BL_USERWORKLOAD
BL_USERWORKSTEP
BL_USERWORKSTEPDIVISION
BL_WORKTYPE
BL_WORKSTEP
BL_WORKSTEPDIVISION
BL_WORKSTEPRULE
BL_BOOKMARKCONFIG
```

-continued
```
BL_BOOKMARKMAP
BL_DOCTYPEMAP
BL_UPDATEORDER
BL_SYSTEMPARAM
BL_EVENTPROCFIELDMAP
BL_LETTER
BL_LETTERGROUP
```

In addition, there will almost always be a set of business specific tables at each site.

The User Profile table (BL_USERPROFILE) is a reference table that stores all the users in the system and their associated characteristics. The User Distribution process accesses the User Profile table to determine whether a user is available to receive work.

```
BL_USERPROFILE
(
    SUSERID         VARCHAR2 (8)    not null,
    SUSERNAME       VARCHAR2 (64)   not null,
    BISAVAILABLE    CHAR (1)        not null,
)
```

The Program Security table (BL_PROGRAMSECURITY) stores the first level of security, the program module level. BLProgramSecurity 76 accesses the table. The table records are maintained by business users through the System Maintenance interface.

```
BL_PROGRAMSECURITY
(
    SUSERID         VARCHAR2 (8)    not null,
    SPROGRAMNAME    VARCHAR2 (16)   not null,
)
```

The Task Security table (BL_TASKSECURITY) stores the second level of security, the task level. BLProgramSecurity 76 accesses the table. The table records are maintained by business users through the System Maintenance interface.

```
BL_TASKSECURITY
(
    SUSERID         VARCHAR2 (8)    not null,
    SPROGRAMNAME    VARCHAR2 (16)   not null,
    STASKNAME       VARCHAR2 (16)   not null,
)
```

The Function Security table (BL_FUNCTIONSECURITY) stores the third level of security, the function level. BLProgramSecurity 76 accesses the table. The table records are maintained by business users through the System Maintenance interface.

```
BL_FUNCTIONSECURITY
(
    SUSERID         VARCHAR2(8)     not null,
    SPROGRAMNAME    VARCHAR2(16)    not null,
    STASKNAME       VARCHAR2(16)    not null,
    SFUNCTIONNAME   VARCHAR2(16)    not null,
)
```

The User Work Load table (BL_USERWORKLOAD) stores the relative load that each user should be assigned during the User Distribution process. The records in the table are maintained by business users through the System Maintenance interface.

```
BL_USERWORKLOAD
(
    SUSERID          VARCHAR2 (8)     not null,
    SWORKTYPE        VARCHAR2 (16)    not null,
    ILOADFACTOR      NUNBER (4)       not null,
)
```

The User Work Step table (BL_USERWORKSTEP) defines the work steps that a user is allowed to access.

```
BL_USERWORKSTEP
(
    SUSERID          VARCHAR2 (8)     not null,
    SWORKTYPE        VARCHAR2 (16)    not null,
    SWORKSTEP        VARCHAR2 (16)    not null,
)
```

The User Work Step Division table (BL_USERWORKSTEPDIVISION) stores the order of work step divisions in which a user receives work. BLCaseSession 60 accesses this table using the GetUserWorkList method.

```
BL_USERWORKSTEPDIVISION
(
    SUSERID              VARCHAR2(8)      not null,
    SWORKTYPE            VARCHAR2(16)     not null,
    SWORKSTEP            VARCHAR2(16)     not null,
    SWORKSTEPDIV         VARCHAR2(16)     not null,
    IWORKSTEPDIVPRIORITY NUMBER(2)        not null,
)
```

The Work Type table (BL_WORKTYPE) stores each different type of work in the system. A work type is defined as the data and processes associated with work. The parameters associated with each work type describe the database table and the workflow engine class that should be accessed for processing. Work Types are associated with a specific BLCase Table and the system can support multiple Work Types.

```
BL_WORKTYPE
(
    SWORKTYPE            VARCHAR2(16)     not null,
    SWORKTYPENAME        VARCHAR2(64)     not null,
    SCASETABLENAME       VARCHAR2(64)     not null,
    SWORKFLOWCLASS       VARCHAR2(64)     null,
    BPROCESSMULTIPLEEVENTS CHAR(1)        null,
)
```

The Work Step table (BL_WORKSTEP) stores all the work steps associated with a work type. The work steps must also correspond to the workflow engine process map. There are characteristics about work steps that are captured in this table. The table is configured initially during system implementation. It is not changed often during the life of the system.

```
BL_WORKSTEP
(
    SWORKTYPE               VARCHAR2(16)    not null,
    SWORKSTEP               VARCHAR2(16)    not null,
    SWCRKSTEPNAME           VARCHAR2(64)    not null,
    BISSYSTEMSTEP           CHAR(1)         not null,
    BISFILTERED             CHAR(1)         not null,
    BISEVENTALLOWED         CHAR(1)         not null,
    SWORKFLOWPERFORMERNAME  VARCHAR2(64)    null,
    SEVENTACTIONCODE        CHAR(1)         null,
)
```

The Work Step Division table (BL_WORKSTEPDIVISION) stores the work step divisions associated with each work type and work step combination. Work Step Divisions are segmentations of Work Steps that provide work specialization. The records are maintained by business users through the System Maintenance interface.

```
BL_WORKSTEPDIVISION
(
    SWORKTYPE           VARCHAR2(16)    not null,
    SWORKSTEP           VARCHAR2(16)    not null,
    SSWWORKSTEPDIV      VARCHAR2(16)    not null,
    SWORKSTEPDIVNAME    VARCHAR2(64)    not null,
    IWORKSTEPDIVTYPE    NUMBER(1)       not null,
    BISDEFAULT          CHAR(1)         not null,
)
```

The Work Step Rule table (BL_WORKSTEPRULE) stores the rules associated with work step divisions. The rules are prioritized to read and determine to which work step division a case should be assigned. These rules may be maintained by business users through the System Maintenance interface.

```
BL_WORKSTEPRULE
(
    SWORKTYPE         VARCHAR2(16)      not null,
    SWORKSTEP         VARCHAR2(16)      not null,
    IWORKSTEPRULENUM  NUMBER(4)         not null,
    SWORKSTEPRULE     VARCHAR2(2000)    not null,
    SNEWWORKSTEPDIV   VARCHAR2(16)      not null,
    BDISABLED         CHAR(1)           not null,
)
```

The Book Mark Configuration table (BL_BOOKMARKCONFIG) stores the height and width of each letter field. It is accessed by the Letter Generation Wizard to size each bookmarked field when presenting the data entry screen to a user. This table is optional and is managed by business users through the System Maintenance interface.

```
BL_BOOKMARKCONFIG
(
    SBOOKMARKNAME    VARCHAR2(64)    not null,
    IHEIGHT          NUMBER(2)       null,
    IWIDTH           NUMBER(2)       null,
)
```

The Book Mark Map table (BL_BOOKMARKMAP) stores the association between a letter bookmark and the case field that should be assigned to it. The Letter Generation Wizard uses the table to query by the bookmark name and replace the bookmark with the specified case field value.

```
BL_BOOKMARKMAP
(
    SBOOKMARK       VARCHAR2 (64)   not null,
    SWORKTYPE       VARCHAR2 (16)   not null,
    SFIELDNAME      VARCHAR2 (64)   not null,
    IFIELDTYPE      NUMBER (2)      not null,
)
```

The Doc Type Map table (BL_DOCTYPEMAP) maps an incoming document type to a work type. This table is accessed by the Case Builder process.

```
BL_DOCTYPEMAP
(
    SDOCTYPE        VARCHAR2 (16)   not null,
    SWORKTYPE       VARCHAR2 (16)   not null,
)
```

The Update Order table (BL_UPDATEORDER) dictates the order in which tables should be updated for a transaction. DBConnMgr 66 accesses this table to commit records in the correct order. This table is configured during system implementation and is not changed very often during the life of the system. It is modified by a knowledgeable system administrator or programmer.

```
BL_UPDATEORDER
(
    IORDER          NUMBER          not null,
    STABLENAME      VARCHAR2 (64)   not null,
)
```

The System Parameter table (BL_SYSTEMPARAM) stores system wide parameters. It is accessed by each program module.

```
BL_SYSTEMPARAM
(
    SPARAMNAME      VARCHAR2 (32)   not null ,
    SPRAMVALUE      VARCHAR2 (256)  null     ,
)
```

The Event Process Field Map table (BL_EVENTPROCFIELDMAP) stores the work object fields that are created when a work object is injected into the workflow engine. There are different mappings for each work type. The table provides a configurable method to map fields to the work object before it is injected into the workflow. This is determined at each system implementation without needing to modify code. It is accessed by the Event Processor module.

```
BL_EVENTPROCFIELDMAP
(
    SFIELDNAME          VARCHAR2(64)    not null,
    IFIELDTYPE          NUMBER(2)       not null,
    SWORKITEMFIELDNAME  VARCHAR2(64)    not null,
    SWORKTYPE           VARCHAR2(16)    not null,
)
```

The Letter table (BL_LETTER) stores all the letter templates in the system and their associated characteristics. They are associated with the Letter Group table. The Letter Generation Wizard accesses the table to retrieve all the letter templates into a list given a letter group. The table is maintained by business users through the System Maintenance interface.

```
BL_LETTER
(
    SGROUPID            VARCHAR2(16)    not null,
    SLETTERID           VARCHAR2(16)    not null,
    SLETTERDISPLAYNAME  VARCHAR2(128)   not null,
    SLETTERFILENAME     VARCHAR2(32)    not null,
    IDISPLAYORDER       NUMBER(4)       not null,
)
```

The Letter Group table (BL_LETTERGROUP) stores the list of letter templates grouped in business groups. The Letter Generation Wizard reads this table to display the list of valid tables for the user to select from. The Letter Group table is maintained by business users through the System Maintenance interface.

```
BL_LETTERGROUP
(
    SGROUPID            VARCHAR2(16)    not null,
    SGROUPDISPLAYNAME   VARCHAR2(128)   not null,
    IDISPLAYORDER       NUMBER(4)       not null,
)
```

An example of workflow processing in a workflow processing system according to the present invention is illustrated in FIG. 6. During system implementation, the base workflow process flow is defined in the workflow platform in the conventional platforms 20 using a workflow engine like FileNET Visual WorkFlo. Data Capture 130 may be a conventional process that places information to be used in electronic form. Imaging of documents, input of data from a database, input of transactional data, etc. are included. The Case Builder 132 organizes the information according to rules in the workflow platform in the conventional platforms 20 and stores links to the data in conventional databases, data warehouses, etc. where the information is stored in the conventional platforms 20 by Data Capture 130. The Events Processor 134 is initially executed to place the new case in the first work step 124. The Queue Assignment module 136 is then executed to place the case in the appropriate work queue or work step division, as discussed above with respect to FIG. 5. If the work step division requires 138 a case to be "owned" by a user, the user distribution module 140 is executed to assign ownership. Regardless of whether the case has been assigned to a particular user, Case Manager 142 could be executed next. Case Manager 142 is uniquely created for each system implementation. Case Manager 142 may be created using development tools such as Visual Basic or Visual C++. The case objects described with reference to FIGS. 4A–4C are used to quickly develop the code for Case Manager 142.

If a letter is created in step 144, BLCase creates a new BLDraftCaseItem object 102. If it is desirable to convert the letter to TIFF format before committal to permanent storage on, e.g., an optical disk, the draft case item is sent to the Draft Committal process 146 for conversion of the letter to TIFF format and storage on, e.g., the optical disk. This process also changes the draft case item to a regular case item. Processing then continues as defined for the specific business application in the workflow, engine and therefore, the specific processing is not illustrated in FIG. 6. Typically, the object is suspended for additional information, destroyed because the case is done, or routed to another user.

Preferably, at various times during work on a case, a check is made 148 to determine whether the case should be sent to Quality Assurance. If so, the Queue Assignment module 150 is called to place the case in a work division 126 for case quality assurance review 152.

As illustrated in FIG. 7, the present invention can be implemented on a conventional general purpose computer system, including a processor 202, memory unit 204 and input/output unit 206. When implemented on an enterprise basis, there will likely be a plurality of processors, memory units and very many input/output units, such as desktop or notebook computers (not shown). These devices are likely to be networked, possibly using multiple network protocols. Any suitable conventional hardware and software can be used to provide the computer system, including distributed processing, intranets, personal computers, etc.

The present invention has been described with respect to exemplary embodiments of a workflow processing framework, workflow development system and workflow processing system.

However, the invention is not limited to these specific embodiments, but encompasses all of the subject matter of the following claims.

The many features and advantages of the invention are apparent from the detailed specification and, thus, it is intended by the appended claims to cover all such features and advantages of the invention which-fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

Conventional platforms
Foundation objects
Common objects
Business processes
BLCaseSession
BLCaseWorkList
BLCase
BLDBConnMgr
BLConfigParam
BLDebugLog
BLErrorLog
BLStatLog
BLProgramSecurity
BLCoreInstMgr
BLWFWorkListFields
BLWFWorkListField
VWOWorkQuery
BLCaseFields
BLWFWorkItemFields
BLCaseEvents
BLCaseItems
BLCaseItem
BLCaseAuditSession
BLDraftCaseItem
BLDraftCaseFields
BLCaseAuditSessions
BLCaseAuditSession
BLCaseAudits
BLCaseAudit
ADODB RecordSet
Event Trigger
Work item(s)
Work step
Work division
Data Capture
Case Builder
Events Processor
Queue Assignment
Assign User?
User Distribution
Case Manager
Letter Created?
Draft Committal
Send for Quality Assurance?
Queue Assignment
Case Quality Assurance
Processor
Memory
Input/Output

What is claimed is:

1. A workflow processing framework, scalable for use by a single department to an entire enterprise, comprising:
    a set of software objects, each unique throughout the enterprise, to support corresponding business functions;
    a database management system, accessed by a subset of the software objects, defining work taxonomy and work steps for workflow processing, said system comprising:
        a first database, accessed by the subset of the software objects via the database management system, defining work type and work steps for workflow processing, and
        a second database, accessed by the subset of the software objects via the database management system, storing case information within the workflow processing framework; and
    a workflow engine utilized by said set of software objects and the subset of the software objects using the work taxonomy to perform the workflow processing and utilized by said workflow processing framework in combination with said database management system to perform case processing, said workflow processing framework defining work step divisions for at least one of the work steps, wherein the work step divisions correspond to component processes defined by work step rules, and the work step divisions for the at least one of the work steps are prioritized when presented to a user.

2. A workflow processing framework, scalable for use by a single department to an entire enterprise, comprising:
    a set of software objects, each unique throughout the enterprise, to support corresponding business functions;
    a database, accessed by a subset of said software objects, defining work taxonomy and work steps for workflow processing; and a workflow engine used by said set of software objects and the subset of said software objects using the work taxonomy to perform the workflow processing and utilized by said workflow processing framework in combination with said database to perform case processing, said workflow processing framework defining work step divisions for at least one of the work steps, the work step divisions segregating work responsive to work characteristics analyzed according to work step rules, wherein the work step divisions correspond to component processes defined by the work step rules, and the work step divisions for the at least one of the work steps are prioritized when presented to a user.

3. A workflow processing framework, scalable for use by a single department to an entire enterprise, comprising:

a set of software objects, each unique throughout the enterprise, to support corresponding business functions, wherein said software objects comprise common objects that are implementation independent and foundation objects;

a database management system, accessed by a subset of the software objects, defining work taxonomy and work steps for workflow processing, said system comprising:
  a first database, accessed by the subset of the software objects via the database management system, defining work type and work steps for workflow processing, and
  a second database, accessed by the subset of the software objects via the database management system, storing case information within the workflow processing framework; and a workflow engine utilized by said set of software objects and the subset of the software objects using the work taxonomy to perform the workflow processing and utilized by said workflow processing framework in combination with said database management system to perform case processing, said workflow processing framework defining work step divisions for at least one of the work steps, wherein the foundation objects provide communication between the common objects and said workflow engine, the work step divisions correspond to component processes defined by work step rules, and the work step divisions for the at least one of the work steps are prioritized when presented to a user.

4. The workflow processing framework as recited in claim 3, further comprising business processes customizable for each implementation.

5. The workflow processing framework as recited in claim 4, wherein said business processes comprise at least one rules processor for building cases, responding to events and assigning work to specific work step divisions.

6. A workflow processing framework, scalable for use by a single department to an entire enterprise, comprising:

a set of software objects, each unique throughout the enterprise, to support corresponding business functions;

a database management system, accessed by a subset of the software objects, defining work taxonomy and work steps for workflow processing, said system comprising:
  a first database, accessed by the subset of the software objects via the database management system, defining work type and work steps for workflow processing, and
  a second database, accessed by the subset of the software objects via the database management system, storing case information within the workflow processing framework; and a workflow engine utilized by said set of software objects and the subset of the software objects using the work taxonomy to perform the workflow processing and utilized by said workflow processing framework in combination with said database management system to perform case processing, wherein said first database and said workflow engine are accessed by the subset of said software objects to generate a prioritized worklist each time a new session is started by a user, and where the subset of said software objects used to generate the prioritized worklist can invoke a prefetch object utilizing program code to perform a prefetch operation having an enumerated type to determine components of the case information to be. prefetched from said second database and not specifying in the program code of the prefetch object what format of data is involved in the prefetch operation, said workflow processing framework defining work step divisions for at least one of the work steps, where the work step divisions for the at least one of the work steps are prioritized.

7. The workflow processing framework as recited in claim 1, wherein said database management system further comprises user-definable tables to define at least one work queue and determine contents of work items in the at least one work queue.

8. The workflow processing framework as recited in claim 7, wherein said software objects comprise a queue assignment module to access the user-definable tables when a work item is received and to add the work item to at least one work step division based on business rules defined.

9. The workflow processing framework as recited in claim 1, wherein the subset of said software objects are used to retrieve a prioritized worklist comprising a prefetch object comprising program code to perform a prefetch operation based on information in said database and not specifying in the program code of the prefetch object what format of data is involved in the prefetch operation.

10. The workflow processing framework as recited in claim 1, wherein the corresponding business functions of said software objects are linked in a parent-child relationship to provide easy navigation of business data hierarchy.

11. The workflow processing framework as recited in claim 1, wherein said database further defines relationships between cases and business events.

12. A method of developing a workflow processing system, comprising:

providing a set of software objects, each uniquely performing a corresponding function in the workflow processing system, and a set of process definitions, accessed by a subset of the software objects;

providing a database management system, comprising:
  a first database, accessed by a subset of the software objects via the database management system, defining work type and work steps for workflow processing; and
  a second database, accessed by the software objects via the database management system, storing case information within the workflow processing system;

utilizing a workflow engine to modify the process definitions which correspond to work types and work steps for workflow processing, wherein the workflow engine is utilized by said workflow processing system in combination with said database management system to perform case processing; and defining work step divisions using the workflow processing system for at least one of the work steps, wherein the work step divisions correspond to component processes defined by work step rules, the work step divisions for the at least one of the work steps are prioritized when presented to a user, and the workflow processing system is supported by the workflow engine and the database management system.

13. The method as recited in claim 12, wherein said providing of process definitions comprises providing tables, configurable by a user and accessible by a subset of the software objects unchanged during said generating of the workflow processing system, to define the work types, the work steps and work divisions of the work steps, and wherein said modifying comprises configuring the tables accessed by the subset of the software objected unchanged during said generating.

14. The method as recited in claim 13, wherein the tables comprise an event process field map table to pre-fill work object fields from case data defining a work type for each work object in the workflow processing system without modifying program code.

15. The method as recited in claim 12, further comprising providing customizable user interfaces, separate from the software objects, to perform functions unique to the workflow processing system produced by said generating.

16. The method as recited in claim 15, further comprising providing at least one rules processor for assigning work.

17. A computer system programmed to generate a workflow processing system, comprising:

a memory unit storing a set of software objects, each uniquely performing a corresponding function in the workflow processing system, and a set of process definitions, accessed by a subset of the software objects in a database management system, comprising:

a first database, accessed by a subset of the software objects via the database management system, defining work type and work steps for workflow processing; and a second database, accessed by the software objects via the database management system, storing case information within the workflow processing system;

a processing unit, coupled to said memory unit, to execute the software objects utilizing a workflow engine and database management system accessing the process definitions, wherein the workflow engine is utilized by said workflow processing system in combination with said database management system to perform case processing; and at least one input/output unit, coupled to said memory unit and said processing unit, to enter data stored by said processing unit in the process definitions of said memory unit to define work types and work steps for workflow processing, said workflow processing system defining work step divisions for at least one of the work steps, wherein the work step divisions correspond to component processes defined by work step rules, and the work step divisions for the at least one of the work steps are prioritized when presented to a user.

18. A workflow processing system, comprising:

a memory unit storing a set of software objects, each uniquely performing a corresponding function in said workflow processing system, a database management system, comprising:

a first database, accessed by a subset of the software objects via the database management system, defining work type and work steps for workflow processing, and a second database, accessed by the software objects via the database management system, storing within said workflow processing system;

at least one input/output unit, coupled to said memory unit, to enter and retrieve data stored in the first and second databases of said memory unit; and a processing unit, coupled to said memory unit and to said at least one input/output unit, to execute the software objects utilizing a workflow engine and the database management system and update the case information in the second database based on the work type and work steps in the first database, said workflow processing system defining work step divisions for at least one of the work steps, wherein the work step divisions correspond to component processes defined by work step rules, the work step divisions for the at least one of the work steps are prioritized when presented to a user, and said workflow engine is utilized by said workflow processing system in combination with said database management system to perform case processing.

19. At least one computer program, embodied on a computer-readable medium, to create a workflow processing system, comprising:

a set of software objects, each uniquely performing a corresponding function in the workflow processing system;

a database management system, accessed by a subset of the software objects, comprising:

a first database, accessed by a subset of the software objects via the database management system, defining work type and work steps for workflow processing; and a second database, accessed by the software objects via the database management system, storing within said workflow processing system;

a workflow engine defining a base workflow process flow utilized by said set of software objects and the subset of the software objects to perform the workflow processing, wherein said workflow engine is utilized by said workflow processing system in combination with said database management system to perform case processing; and select graphical user interface modules, said workflow processing system defining the work types and the work: steps that correspond to the base workflow process flow and defining work step divisions for at least one of the work steps, wherein the work step divisions correspond to component processes defined by work step rules, and the work step divisions for the at least one of the work step r prioritized when presented to a user.

20. The at least one computer program as recited in claim 19, wherein the subset of said software objects used to retrieve the prioritized worklist comprise a prefetch object comprising program code to perform a prefetch operation based on information in said database and not specifying in the program code of the prefetch object what format of data is involved in the prefetch operation.

21. The at least one computer program as recited in claim 30, wherein the prefetch object is a multi-threaded object operating in a producer-consumer environment, using semaphores, threads, and class member variables to keep track of current and next case objects, comprising a consumer thread to obtain a current case object from a work list, and a producer thread, executing as long as the prefetch object exists in memory, to retrieve a next available case object when the next case object is null and, when the next case object exists, to wait until the current case object is retrieved into processing by the consumer thread before retrieving the next available case object.

22. A workflow processing framework, scalable for use by a single department to an entire enterprise, comprising:
- a set of software objects, each unique throughout the enterprise, to support corresponding business functions;
- a database management system, accessed by a subset of the software objects, defining work taxonomy and work steps for workflow processing, said system comprising:
    - a first database, accessed by the subset of the software objects via the database management system, defining work type and work steps for workflow processing, and
    - a second database, accessed by the subset of the software objects via the database management system, storing case information within said workflow processing framework;
- a workflow engine utilized by said set of software objects and the subset of the software objects using the work taxonomy to perform the workflow processing and utilized by said workflow processing framework in combination with said database management system to perform case processing, said workflow processing framework defining work step divisions for at least one of the work steps, the work step divisions segregating work responsive to work characteristics analyzed according to work step rules, wherein the work step divisions correspond to component processes defined by the work step rules, and the work step divisions for the at least one of the work steps are prioritized when presented to a user; and
- at least one rules processor building cases or processing existing cases by organizing data entered or stored in the second database, creating an event in response to the data, generating a work item in response to the event, and assigning work to place each of the cases in a work step division depending on a definition of a corresponding work step.

23. A workflow processing framework, scalable for use by a single department to an entire enterprise, comprising:
- a set of software objects, each unique throughout the enterprise, to support corresponding business functions;
- a database management system, accessed by a subset of the software objects, defining work taxonomy and work steps for workflow processing, said system comprising:
    - a first database, accessed by the subset of the software objects via the database management system, defining work types and work steps for workflow processing,
    - a second database, accessed by the subset of the software objects via the database management system, storing case information within the workflow processing framework; and
- a workflow engine utilized by said set of software objects and the subset of the software objects using the work taxonomy to perform the workflow processing and utilized by said workflow processing framework in combination with said database management system to perform case processing, said workflow processing framework defining work step divisions for at least one of the work steps, wherein the work step divisions correspond to component processes defined by work step rules and assigning a case to a work step division based on case data and the work step rules associated with the work step and assigning the case to a user based on work load computed using data in the second database and a work load factor in the first database when[]the work step division is a user type.

24. A workflow processing framework, scalable for use by a single department to an entire enterprise, comprising:
- a set of software objects, each unique throughout the enterprise, to support corresponding business functions;
- a database, accessed by a subset of said software objects, defining work taxonomy and work steps for workflow processing; and
- a workflow engine used by said set of software objects and the subset of said software objects using the work taxonomy to perform the workflow processing and utilized by said workflow processing framework in combination with said database to perform case processing, said workflow processing framework defining work step divisions for at least one of the work steps, the work step divisions segregating work responsive to work characteristics analyzed according to work step rules, wherein the work step divisions correspond to component processes defined by the work step rules, the work step divisions for the at least one of the work steps are prioritized when presented to a user, and said workflow processing framework enabling the user to define work steps without requiring coding changes to the subset of the software objects.

25. A workflow processing framework, scalable for use by a single department to an entire enterprise, comprising:
- a set of software objects, each unique throughout the enterprise, to support corresponding business functions;
- a database, accessed by a subset of said software objects, defining work taxonomy and work steps for workflow processing; and
- a workflow engine used by said set of software objects and the subset of said software objects using the work taxonomy to perform the workflow processing and utilized by said workflow processing framework in combination with said database to perform case processing, said workflow processing framework defining work step divisions for at least one of the work steps, the work step divisions segregating work responsive to work characteristics analyzed according to work step rules, wherein the work step divisions correspond to component processes defined by the work step rules, said workflow processing framework enabling a user to select from a list of cases and reassign at least one case from the list or prompt the at least one case into the workflow to balance a workload.

* * * * *